Nov. 27, 1928.
H. A. HIGGINS
1,693,234
RADIATOR
Original Filed March 8, 1926
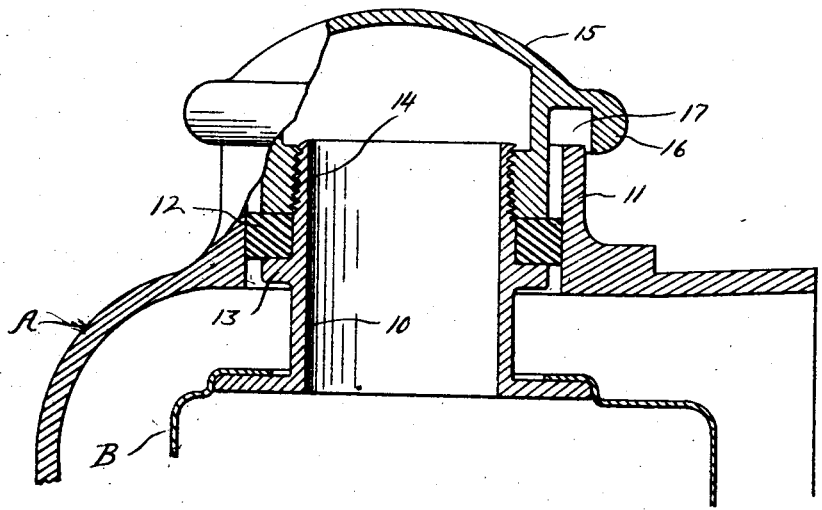
Inventor
Harry A. Higgins
By Whittemore Hulbert Whittemore
 Belknap    Attorneys Patented Nov. 27, 1928.

1,693,234

UNITED STATES PATENT OFFICE.

HARRY A. HIGGINS, OF DETROIT, MICHIGAN.

RADIATOR.

Application filed March 8, 1926, Serial No. 93,334. Renewed October 11, 1928.

The invention relates to radiator constructions and refers more particularly to motor vehicle radiators.

One of the objects of the invention resides in providing means for effectively absorbing the shocks and vibrations between the radiator core and casing whereby the filler neck is resiliently suspended or floated within the casing.

A further feature of the invention resides in the provision of a resilient ring of material forming a connection between the filler neck and casing together with means for compressing or distorting the resilient material affording a water tight connection and efficient vibration absorber.

With these and other objects in view, the invention resides in the novel features of construction and combination and arrangements of parts as more fully hereinafter described and claimed.

Referring to the accompanying drawings, the single figure represents a detail sectional elevation view illustrating the invention.

In the drawings, reference character A represents the radiator casing and shell and B the radiator core, the latter having a filler neck 10 spaced from and positioned within the flanged casing opening 11. 12 represents a ring of resilient material of any suitable composition such as rubber, extending circumferentially around the filler neck 10 between the latter and the inner wall of the flanged opening 11. For compressing the material 12 laterally into engagement with the inner wall of the flanged opening 11 and the filler neck 10, the latter is formed below the material 12 with a shouldered portion 13 forming a seat therefor. Above the material the filler neck is threaded at 14 to receive the closure cap 15, the lower end of which is engageable with the material 12 so that upon rotating the cap 15 in one direction the material 12 is laterally compressed between the cap and shoulder 13 causing the material 12 to firmly engage the flanged opening 11 and filler neck 10. Thus the material 12 serves not only to absorb shocks and vibration between the radiator casing and core so as to eliminate noise and damage to the radiator parts, but further serves as a filler gasket preventing leakage of the cooling fluid between the filler neck and casing.

If desired, the cap 15 may be formed with the laterally spaced downwardly extending circumferential flange 16 affording a recess 17, for accommodating the upper end of the flanged opening 11. Thus, the cap 15 serves also to cover the space between the filler neck and casing.

While it is believed that from the foregoing description, the nature and advantage of my invention will be readily understood, I desire to have it understood that I do not limit myself to what is herein shown and described and that such changes may be resorted to when desired as fall within the scope of the claim.

What I claim as my invention is:—

1. A radiator comprising a casing, an element within the casing provided with a filler neck extending within an opening in the casing and spaced from the inner wall of said opening, a yieldable member forming a connection between the filler neck and casing to absorb relative vibrations therebetween, and a closure cap threadedly engaging said filler neck and acting on said yielding member for causing distortion of said member.

2. A radiator comprising a casing, an element within the casing provided with a filler neck extending within an opening in the casing and spaced from the inner wall of said opening, a yieldable member forming a connection between the filler neck and casing to absorb relative vibrations therebetween, and a filler neck closure cap threadedly engaging said filler neck and acting on said yielding member to cause lateral compression thereof.

3. A radiator comprising a casing, an element within the casing provided with a filler neck extending within an opening in the casing and spaced from the inner wall of said opening, a yieldable member forming a connection between the filler neck and casing to absorb relative vibrations therebetween, said filler neck being provided with a shoulder forming a support for the said yieldable member, and a closure cap having means acting on said yielding member for distorting the same laterally between the said shoulder and said means.

4. A radiator comprising a casing, an element within the casing provided with a filler neck extending within an opening in the casing and spaced from the inner wall of said opening, a yieldable member forming a connection between the filler neck and casing to absorb relative vibrations therebetween, and a filler neck closure cap threadedly engaging said filler neck and acting on said yielding member to cause distortion thereof, said cap having a circumferential recessed portion overhanging the said casing opening.

5. A radiator comprising a casing, an element within the casing provided with a filler neck extending within an opening in the casing and spaced from the inner wall of said opening, a yieldable member forming a connection between the filler neck and casing to absorb relative vibrations therebetween, and a filler neck closure cap threadedly engaging said filler neck and acting on said yielding member to cause distortion thereof, said cap having a circumferential recessed portion overhanging the said casing opening, said recessed portion being adapted to receive the portions of the casing bordering the said opening therein.

6. In a radiator construction, the combination with a radiator core and a casing therefor, of a filler neck for the core projecting through an opening in the casing, means for resiliently suspending the filler neck within the said opening and for absorbing the relative vibrations therebetween, and means including the closure cap of the filler neck for compressing the said vibration absorbing means.

In testimony whereof I affix my signature.

HARRY A. HIGGINS.